United States Patent [19]

Wolf et al.

[11] 4,453,040

[45] Jun. 5, 1984

[54] TELEPHONE FEATURE ASSIGNMENT CIRCUIT

[75] Inventors: Ann L. Wolf, Pinellas Park; Louis W. Smith, St. Petersburg, both of Fla.

[73] Assignee: GTE Automatic Electric Inc., Northlake, Ill.

[21] Appl. No.: 452,587

[22] Filed: Dec. 23, 1982

[51] Int. Cl.³ .......................................... H04M 1/274
[52] U.S. Cl. ................... 179/81 C; 179/81 R; 179/90 D; 179/99 LS
[58] Field of Search ................ 179/81 C, 84 L, 84 A, 179/99 LS, 2 A, 90 BD, 90 B, 84 VF, 90 D, 81 R, 84 R; 340/825.31, 825.48, 825.32

[56] References Cited

U.S. PATENT DOCUMENTS 4,243,845 1/1981 Feinberg ........................... 179/90 B
4,324,954 4/1982 Taylor ............................. 179/90 B
4,358,640 11/1982 Murray ............................ 179/90 D Primary Examiner—A. D. Pellinen
Assistant Examiner—James L. Dwyer
Attorney, Agent, or Firm—Gregory G. Hendricks; Peter Xiarhos

[57] ABSTRACT

A telephone feature assigment circuit for use in a telephone having a plurality of features and pushbuttons. Each feature can be assigned to a selected one of the pushbuttons. The telephone also includes a microprocessor and visual and audible prompting devices. These devices are operated by the microprocessor in response to prolonged operation of a selected pushbutton. Keypad initiated signals are then provided to identify the feature to be assigned to the selected pushbutton. The microprocessor subsequently causes the assigned feature to be performed in response to momentary operation of the selected pushbutton.

21 Claims, 1 Drawing Figure

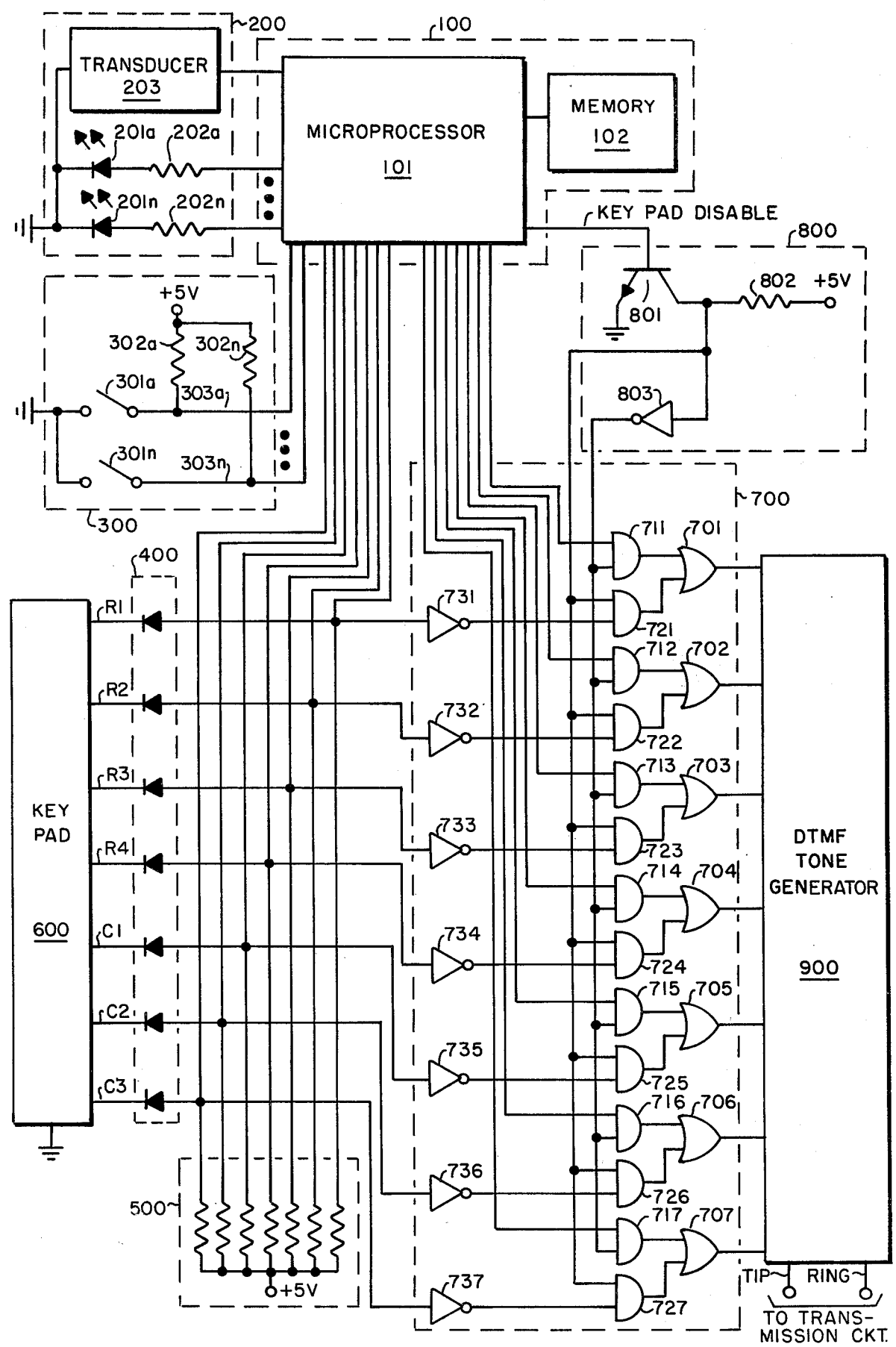

TELEPHONE FEATURE ASSIGNMENT CIRCUIT

CROSS-REFERENCE TO RELATED APPLICATION

A copending and concurrently filed U.S. patent application, Ser. No. 452,588, is related to the present invention. That application is titled "Telephone Station Signaling Lock Circuit". The inventions claimed in both applications were assigned to the same assignee.

FIELD OF THE INVENTION

The present invention relates to telephone stations and more particularly to a telephone having programmable features.

BACKGROUND OF THE INVENTION

Programmable telephones having a variety of features are well known. However, these telephones typically require complex arrays of control and keypad butttons to be dedicated to particular features. These telephones also typically require complex and lengthy user programming operations.

The present invention overcomes these requirements through use of a novel feature assignment circuit which allows the various features of a telephone to be assigned to selected control buttons in response to assignment instructions provided from a standard telephone keypad.

SUMMARY OF THE INVENTION

In accordance with the present invention, a telephone feature assignment circuit is provided for use in a telephone including a plurality of switches each being operative to provide a plurality of appearances of a switch signal, and a keypad being operative to provide a plurality of character signals. The telephone is operative to provide a plurality of features, each in response to operation of a different switch, when each feature is associated with that different switch.

The telephone feature assignment circuit comprises storage means having a plurality of storage locations and being operative to store a plurality of feature codes, each being associated with one of the plurality of features. It also includes a microprocessor connected between the switches and the storage means, and operative in response to the occurrence, in succession for each switch, of a first appearance of predetermined duration of the switch signal, a predetermined character signal of a predetermined duration, at least one character signal having a predetermined relationship to one of the feature codes, and a second appearance of predetermined duration of the switch signal, to store in the storage means a linking signal associating each switch with one of said feature codes, whereby each feature is associated with a different switch.

DESCRIPTION OF THE DRAWING

The single FIGURE of the accompanying drawing is a schematic diagram of a telephone feature assignment circuit in accordance with the present invention.

DESCRIPTION OF THE PREFERRED EMBODIMENT

Referring now to the accompanying drawing the telephone feature assignment circuit of the present invention is shown. Modern electronic telephones have many features, each of which can be executed in response to operation of an associated pushbutton. Such features often include speed calling, last number redial and station lock. The feature assignment circuit of the present invention allows assignment of each feature to a selected pushbutton. Upon completion of such assignment the feature can be executed by operation of the pushbutton assigned to it.

Since the feature assignment circuit operates in the same manner for assignment of any feature to any pushbutton, the operation of this circuit is described with reference to only two representative features, i.e. station lock, and repertory dialing.

This circuit includes processing unit 100 connected to audible and visual display circuit 200, switch circuit 300, diode network 400 and resistor network 500. Keypad 600 is also connected to diode network 400. Also shown connected to processing unit 100 are gating circuit 700 and disable circuit 800. Gating circuit 700 is further connected between Dual Tone Multifrequency (DTMF) tone generator 900 and the junction of the diode network 400 and resistor network 500. Tone generator 900 is connectable to an associated transmission circuit via the TIP and RING leads.

Processing unit 100 includes microprocessor 101 connected to memory 102. Display circuit 200 includes light emitting diodes (LEDs) 201a–201n, resistors 202a–202n and transducer 203. Switch circuit 300 includes switches 301a–301n, each of which is connected to ground when an associated pushbutton is depressed. Switches 301a–301n are also connected to a +5 volt supply via resistors 302a–302n, respectively. Each of these switches is further connected to microprocessor 101 via an associated one of leads 303a–303n. Diode network 400 includes seven protection diodes connected to keypad 600 via four row (R1–R4) and three column (C1–C3) leads. These diodes protect microprocessor 101 from extraneous high voltage signals at keypad 600.

Keypads are old and well known and typically include four rows and three columns of pushbuttons. Each pushbutton connects an associated row and column lead to ground when it is operated. DTMF tone generators are also old and well known and are operative to provide a plurality of pairs of tones each in response to an associated pair of row and column leads being connected to ground. Resistor network 500 includes seven resistors connected to the +5 volt source. Each resistor is further connected to an associated diode in diode network 400. Gating circuit 700 includes OR gates 701–707 connected to DTMF tone generator 900. The first input of each of these gates is connected to an associated AND gate in AND gate group 711–717 and the second input of each of these gates is connected to an associated AND gate in AND gate group 721–727. Disable circuit 800 includes transistor 801. This transistor has a base connected to microprocessor 101, an emittter connected to ground, and a collector connected to the +5 volt source via resistor 802. This circuit also includes inverter 803 connected to the collector of transistor 801. The second input of each gate in AND gate group 711–717 is connected to inverter 803 and the first input of each gate in AND gate group 721–727 is connected to transistor 801. The first input of each gate in AND gate group 711–717 is connected to microprocessor 101 and the second input of each gate in AND gate group 721–727 is connected to an associated inverter in inverter group 731–737. Each inverter is further connected to the junction of an associated diode and resistor in diode and resistor networks 400 and 500, respectively.

To assign the station lock feature to a particular pushbutton, a selected pushbutton is depressed and held depressed for a predetermined time, e.g. three seconds. This causes the associated switch, e.g. 301a, to close and connect and associated lead, e.g. 303a, to ground. Microprocessor 101 then detects the resultant first appearance of a logic level 0 switch signal on lead 303a. If this signal is present for the required predetermined time microprocessor 101 determines it to be a feature assignment request. If this signal is only momentarily present, e.g. less than 1.5 seconds, microprocessor 101 determines it to be a feature execution request.

When a feature assignment request is made for the pushbutton connected to switch 301a, microprocessor 101 applies a steady logic level 1 first sensible control signal to LED 201a (first sensible indicating means) and a short duration, e.g. 300 milliseconds, logic level 1 second sensible control signal to transducer 203 (second sensible indicating means). LED 201a then provides a steady light or first visual signal and transducer 203 provides a single beep tone or first audible signal. These signals acknowledge prolonged operation of the pushbutton connected to switch 301a. When this pushbutton is subsequently released, microprocessor 101 detects the resultant logic level 1 signal on lead 303a and applies a periodic or pulsing logic level 1 third sensible control signal to LED 201, causing it to flash at a rate of 120 interruptions per minute. This second visual signal acts as a prompting signal for more information.

A pedetermined keypad button, e.g. digit number two (2) is then depressed and held depressed for a predetermined time, e.g. 1.5 seconds. When the digit number two keypad button is depressed, the associated row, R1, and column, C2, leads are connected to ground. Microprocessor 101 detects the resultant prolonged logic level 0 signals on these leads and applies two successive short duration logic level 1 signals (fourth sensible control signal) to transducer 203, causing it to provide a double beep second audible tone. This double beep tone acts as a prompting signal for additional data identifying the feature to be assigned to the selected pushbutton.

Selected keypad buttons are then successively depressed to provide signals representative of the selected feature code. Typically two keypad buttons are depressed successively. Microprocessor 101 detects and accumulates the resultant logic level 0 signals on the row and column leads. Microprocessor 101 continues to accumulate these row and column signals until the pushbutton connected to lead 301a is depressed and held depressed for the prolonged predetermined time. The prolonged second appearance of a logic level 0 switch signal on lead 303a informs microprocessor 101 that all of the keypad signals identifying the selected feature have been provided. Microprocessor 101 then determines a data code associated with the accumulated row and column signals and stores this data code in memory 102 at a location reserved for the selected pushbutton. Since these data codes are preassigned to the available features, the code identifying the selected feature is now stored in a memory location associated with the pushbutton connected to switch 301a.

Microprocessor 101 then applies a steady logic level 0 fifth sensible control signal to LED 201a and a short duration logic level 1 sixth sensible control signal to transducer 203. Transducer 203 then provides a single beep third audible tone and LED 201a is extinguished (third visual signal). These signals indicate completion of assignment of the selected feature to the button connected to switch 301a. Operation of the selected feature can then be initiated by depression of the pushbutton connected to switch 301a, if no further data is required for operation of this feature. Such a feature would be the station lock feature.

However, some features, such as speed calling or repertory dialing do require additional data. Such additional data would specify the telephone number to be dialed when these features are executed. To provide such additional data the pushbutton assigned to the selected feature is depressed. If the pushbutton connected to switch 301n is assigned to the repertory dialing feature, a code representing this feature would be sorted in memory 102 at a location reserved for that pushbutton.

To provide the telephone number required for this feature, the pushbutton connected to switch 301n is depressed and held depressed for the required prolonged period of time. Microprocessor 101 detects the resultant third appearance of a logic level 0 switch signal on lead 303n and causes transducer 203 and LED 201n to provide a single beep tone and steady light signal, respectively.

The user then releases the pushbutton connected to switch 301n. Microprocessor 101 detects the resultant logic level 1 signal on lead 303n and causes LED 201n to flash at the 120 interruptions per minute rate. This visual signal acts as a prompting signal for additional data representative of the telephone number to be associated with the speed calling feature.

Selected keypad buttons are then successively depressed to provide microprocessor 101 with that telephone number. Microprocessor 101 concurrently accumulates the resultant row and column signals. Upon completion of such keypad dialing the pushbutton connected to switch 301n is depressed and held depressed for the required prolonged time thereby providing a fourth appearance of a logic level 0 switch signal. Microprocessor 101 then stores the telephone number representative of the accumulated row and column signals, in memory 102 at a location reserved for the pushbutton connected to switch 301n. Microprocessor 101 then causes LED 201n to turn off, and transducer 203 to provide a single beep tone. These visual and audible signals indicate completion of the data entry process.

To execute a feature assigned to a particular pushbutton that pushbutton is momentarily depressed. For example, to execute the repertory dial feature, the pushbutton connected to switch 301n is momentarily depressed. Microprocessor 101 detects the resultant logic level 0 signal on lead 303n and reads the location in memory 102 that was reserved for that pushbutton. Since that location contains the code assigned to the repertory dial feature, microprocessor 101 causes LED 201 to provide a steady light signal and begins execution of the repertory dial feature by applying a logic level 1 disable signal to the keypad disable lead. Transistor 801 then applies a logic lead 0 signal to the first input of each gate in AND gate group 721–727 thereby preventing the keypad signals from reaching DTMF tone generator 900, when microprocessor 101 is transmitting.

Microprocessor 101 then transmits the stored repertory dial telephone number to AND gate group 711-717. This telephone number appears as a pair of logic level 1 row and column signals for each digit or character in the telephone number. A logic level 1 signal appears at the first input of each gate in AND gate group 711-717 since inverter 803 inverts the logic level 0 signal from transistor 801. The logic level 1 row and column signals from microprocessor 101 are then gated by the associated gate in AND gate group 711-717 to DTMF tone generator 900 via associated gates in OR gate group 701-707. DTMF tone generator then applies a pair of tones associated with each pair of row and column signals to the TIP and RING leads.

To execute the station lock feature the pushbutton connected to switch 301a is momentarily depressed. Microprocessor 101 detects the resultant momentary presence of a logic level 0 signal on lead 303a and reads the location in memory 102 that was reserved for that pushbutton. Since that location contains the code identifying the station lock feature, microprocessor 101 begins execution of that feature by writing a logic level 1 signal into a station lock word in memory 102 and causing LED 201 to provide a steady light signal. The contents of this word provide microprocessor 101 with an internal indication of whether the signaling circuit is locked. Microprocessor 101 then applies a logic level 1 keypad disable signal to the base of transistor 801, causing it to turn on and apply a logic level 0 signal to the first input of each AND gate group 721-727. These gates then apply logic level 0 signals to the second input of each gate in OR gate group 701-707. Since microprocessor 101 is not transmitting logic level 0 signals appear at the second input of each gate in AND gate group 711-717. Consequently logic level 0 signals also appear at the first input of each gate in OR gate group 701-707. These OR gates then apply logic level 0 signals to DTMF tone generator 900 and the station signaling circuit is effectively locked.

Thus the telephone feature assignment circuit of the present invention uses a microprocessor and an associated memory to store codes representative of features assigned to pushbuttons connected to the microprocessor. A selected pushbutton is assigned to a selected feature in response to depression of that pushbutton and transmission of the selected feature to the microprocessor via the keypad. The microprocessor then completes the assignment process by storing the code identifying the selected feature in a location of memory reserved for the selected pushbutton.

It will be obvious to those skilled in the art that numerous modifications of the present invention can be made without departing from the spirit of the invention which shall be limited only by the scope of the claims appended hereto.

What is claimed is:

1. A telephone feature assignment circuit for use in a telephone including a plurality of switches each being operative to successively provide a plurality of appearances of a switch signal, and a keypad being operative to provide a plurality of character signals, said telephone being operative to provide a plurality of features, each in response to operation of a different switch, said telephone feature assignment circuit comprising:
storage means having a plurality of storage locations and being operative to store a plurality of features codes, each being associated with one of said plurality of features;
a microprocessor connected between said switches and said storage means, and operative in response to the occurrence, in succession for each switch, of a first appearance of predetermined duration of said switch signal, a predetermined character signal of a predetermined duration, at least one character signal having a predetermined relationship to one of said feature codes, and a second appearance of predetermined duration of said switch signal, to store in said storage means a data code associating said switch with said one of said feature codes, whereby each feature is assigned to an associated switch.

2. A telephone feature assignment circuit as claimed in claim 1, wherein: at least one of said features is a calling signal related feature and said telephone is operative to provide said calling signal related feature in response to operation of an associated switch;
said microprocessor being further connected to said keypad and further operative in response to the occurrence, in succession for each switch associated with a calling signal related feature, of a third appearance of predetermined duration of said switch signal, at least one character signal representing a calling signal and a fourth appearance of predetermined duration of said switch signal, to store said character signal in a storage location, of said storage means, associated with said calling signal related feature.

3. A telephone feature assignment circuit as claimed in claim 2, wherein there is further included:
first sensible indicating means connected to said microprocessor, said microprocessor being operative in response to said first or third appearance of said switch signal to provide a first sensible control signal, said first sensible indicating means being operative in response to said first sensible control signal to provide a first sensible signal.

4. A telephone feature assignment circuit as claimed in claim 3, wherein there is further included:
second sensible indicating means connected to said microprocessor, said microprocessor being operative in response to said first or third appearance of said switch signal to provide a second sensible control signal, said second sensible indicating means being operative in response to said second sensible control signal to provide a second sensible signal.

5. A telephone feature assignment circuit as claimed in claim 3, wherein said first sensible indicating means comprises a visual signaling means operative in response to said first sensible control signal to provide a first visual signal.

6. A telephone feature assignment circuit as claimed in claim 4, wherein said second sensible indicating means comprises audible signaling means operative in response to said second sensible control signal to provide a first audible signal.

7. A telephone feature assignment circuit as claimed in claim 5, wherein said visual signaling means comprises a light emitting diode operative in response to said first sensible control signal to turn on and thereby provide a light signal.

8. A telephone feature assignment circuit as claimed in claim 6, wherein said second sensible control signal has a predetermined duration; said audible signaling means comprising an audible transducer operative in response to said second sensible control signal to provide a tone of predetermined duration.

9. A telephone feature assignment circuit as claimed in claim 3, wherein said microprocessor is further operative in response to termination of said first or third appearance of said switch signal to provide a third sensible control signal, said first sensible indicating means being operative in response to said third sensible control signal to provide a third sensible signal.

10. A telephone feature assignment circuit as claimd in claim 9, wherein said first sensible indicating means comprises visual signaling means operative in response to said third sensible control signal to provide a second visual signal.

11. A telephone feature assignment circuit as claimed in claim 10, wherein said visual indicating means comprises a light emitting diode; and said third sensible control signal is a periodic sensible control signal; said light emitting diode being operative in response to said periodic sensible control signal to periodically turn on and off and thereby provide a flashing light signal.

12. A telephone feature assignment circuit as claimed in claim 4, wherein said microprocessor is further operative in response to said predetermined keypad signal to provide a fourth sensible control signal; said second sensible indicating means being operative in response to said fourth sensible control signal to provide a fourth sensible signal.

13. A telephone feature assignment circuit as claimed in claim 12, wherein said second sensible indicating means comprises audible signaling means operative in response to said fourth sensible control signal to provide a second audible signal.

14. A telephone feature assignment circuit as claimed in claim 13, wherein said audible signaling means comprises an audible transducer and said second sensible control signal is a double burst sensible control signal; said audible signaling means being operative in response to said double burst sensible control signal to provide a double burst tone signal.

15. A telephone feature assignment circuit as claimed in claim 3, wherein said microprocessor is further operative in response to said second or fourth appearance of said switch signal to provide a fifth sensible control signal, said first sensible indicating means being operative in response to said fifth sensible control signal to provide a fifth sensible signal.

16. A telephone feature assignment circuit as claimed in claim 15, wherein said first sensible indicating means comprises visual signaling means operative in response to said fifth sensible control signal to provide a third visual signal.

17. A telephone feature assignment circuit as claimed in claim 16, wherein said visual signaling means comprises a light emitting diode operative in response to said fifth sensible control signal to turn off and inhibit any light signal.

18. A telephone feature assignment circuit as claimed in claim 4, wherein said microprocessor is further operative in response to said second or fourth appearance of said switch signal to provide a sixth sensible control signal, said second sensible indicating means being operative in response to said sixth sensible control signal to provide a sixth sensible signal.

19. A telephone feature assignment circuit as claimed in claim 18, wherein said second sensible indicating means comprises audible signaling means operative in response to said sixth sensible control signal to provide a third audible signal.

20. A telephone feature assignment circuit as claimed in claim 19, wherein said audible signaling means comprises an audible transducer operative in response to said sixth sensible control signal to turn on and provide a tone of predetermined duration.

21. A telephone feature assignment circuit as claimed in claim 1, wherein said storage means comprises a memory.